Feb. 13, 1934.   A. FLAD   1,946,678
CURRENT GENERATING SYSTEM
Filed July 18, 1932
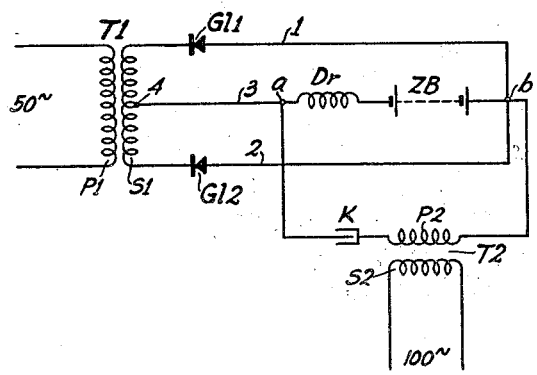
Inventor
Artur Flad
D G Richardson
Atty.

Patented Feb. 13, 1934

1,946,678

UNITED STATES PATENT OFFICE 1,946,678

CURRENT GENERATING SYSTEM

Artur Flad, Berlin, Germany, assignor to Siemens & Halske Aktiengesellschaft, Wernerwerk, Siemensstadt, near Berlin, Germany Application July 18, 1932 Serial No. 623,035, and in Germany July 29, 1931

3 Claims. (Cl. 172—281)

The invention relates to a device for generating signalling currents particularly for use in communication systems.

In systems of this type various devices such as pole alternaters, ringing machines, and the like are employed for this purpose. In small systems where strict economy has to be exercised, the devices mentioned above are too expensive in installation and maintenance so there is therefore, a demand for simpler and cheaper devices.

The invention solves the problem of producing a simple, cheap, and yet reliable device for generating signalling currents. Devices already at hand in small systems and used for other purposes may then be utilized for this purpose owing to the fact that the harmonics produced upon rectification of a low frequency alternating current unsuitable for signal transmission may be converted into currents of a double frequency suitable for signal transmission by means of an arrangement comprising a transformer, the primary winding of which is placed in series with a condenser.

The generation of signalling current depends mainly on the fact that the harmonics in the rectifying circuit produced on the rectification of alternating current are passed to the primary winding of a transformer placed in series with a condenser. The harmonics charge the condenser during each half wave, that is to say during the ascending portion of the curve, or, in other words, when the voltage increases. The condenser is immediately discharged on the descending portion of the curve, that is to say when the voltage drops. Two impulses in opposite direction thus pass through the primary winding of the transformer during each half wave and thus generate an alternating current of double frequency in the secondary winding of the transformer due to the harmonics having the frequency of the alternating current to be rectified. Assuming that the alternating current used for rectification has a frequency of fifty cycles, the alternating current generated in the secondary winding will have a frequency of 100 cycles. Whereas the alternating current of fifty cycles is unsuitable for signalling purposes, such as, for example, busy or clearing signals, the 100-cycle alternating current, having reached within the range of audible frequencies, may be used for this purpose.

By re-rectifying the 100-cycle alternating current passing through the secondary winding and thus double the frequency in the manner described, the second arrangement obviously may be adapted to generate a signalling current of 200 cycles. The frequency, therefore, can be multiplied as required by adding stage after stage of such arrangements, with the result that the device may at the same time be used to increase the frequency of alternating current for any purpose required.

The invention is fully described below in conjunction with an embodiment shown in the drawing.

The arrangement for generating signalling current consists mainly of a transformer T2. The primary winding P2 of said transformer is connected in series with a condenser K and to the rectifying circuit at the points $a$ and $b$. It is assumed in the present case that the rectifying circuit is included in the charging circuit of a central battery ZB of a telephone system and taken from the center tapping of the secondary winding of the transformer. The well known Graetz's circuit may also be employed.

If the arrangement is to be used in systems having no battery-charging device, this is readily arranged by using a resistance instead of the battery ZB with the choke Dr. Apart from this the assembly remains unaltered.

Alternating current with an assumed frequency of fifty cycles is derived from the alternating current mains over the transformer T1. Either end of the secondary winding S1 of the transformer leads to a rectifier Gl 1 and Gl 2 and is connected to the negative pole of the battery at point $b$ over the leads 1 and 2 whereas the center tapping at 4 is connected to the positive pole of the battery over the lead 3, tapping point $a$ and the choke Dr. Both the half waves of the alternating current generated in the secondary winding S1 of the transformer T1 are rectified in known manner by means of the rectifiers Gl 1 and Gl 2. Unequal potential prevails at the points $a$ and $b$, and, therefore, the condenser K is connected to the transformer T2 at these points. The condenser K connected to the lead 3 at the tapping point $a$ is charged at each half wave from the secondary winding S1 of the transformer T1 over the lead 3, choke Dr and battery ZB. The charging circuit for the condenser K extends from the secondary winding S1 of the transformer T1 over the center tapping 4, lead 3, tapping point $a$, condenser K, primary winding P2 of the transformer T2 and the tapping point $b$, partly over the lead 1 and rectifier Gl 1 and partly over lead 2 and rectifier Gl 2 and back to the secondary winding S1 of the transformer T1. The condenser K is charged by the increased voltage in the ascending portion of the curve and is discharged directly the voltage in the descending portion of the curve commences to drop. Two impulses, therefore, pass over the primary winding P2 in opposite direction during each half wave, and, since the harmonics of the alternating current used for rectification have a frequency of exactly fifty cycles, an alternating current having a frequency of 100 cycles is generated in the secondary winding S2 of the transformer T2.

If it should be required to rectify also the alternating current generated in the secondary winding S2 of the transformer T2 and to step up the rectified current to the double frequency in the manner described or connect up another arrangement in series with this object in view, it is possible to obtain any desired frequency by means of this arrangement.

In the embodiment shown, a choke Dr is connected up in the battery or rectifying circuit for the purpose of smoothing the rectified pulsating current. With this object in view, choke chains comprising condensers and impedances are used, and not single chokes only. In such a case it is possible in a corresponding circuit to utilize, for example, a condenser used at the same time for the device in question to generate the high frequency signalling current. The saving of a special condenser which this entails assists in simplifying and cheapening the device still further.

What is claimed is:

1. In combination, a direct-current load, a source of alternating current of a given frequency, means for rectifying both half cycles of the alternating current from said source and for delivering the rectified current to said direct-current load, an impedance connected in series with said direct-current load to minimize the current variations to the load, a transformer, a condenser, and circuit connections placing the condenser and the primary winding of said transformer in series in shunt of the direct-current load and said impedance, whereby alternating current of double said given frequency is delivered by the secondary winding of said signal transformer.

2. In combination, a direct-current load and an alternating-current load, a source of alternating current of a given frequency, means for rectifying both half cycles of the output of said alternating-current source and for delivering the rectified output to said direct-current load, a signal-supply circuit bridged around said direct-current load, a condenser connected in said signal-supply circuit whereby a cycle of alternating current flows in said circuit for each rectified half-cycle delivered to the direct-current load, and a signal circuit deriving alternating current from said signal-supply circuit of double said given frequency.

3. A combined battery charging and tone signal current generating system for telephone systems, comprising a source of alternating current of given frequency, a rectifying system for rectifying both half cycles of the alternating current and supplying the same to a battery, an impedance in series with the battery for minimizing current variations to the battery, together with a tone current generating system comprising a transformer having its primary bridged across the battery and impedance in series with a condenser, said system producing tone signalling current of a frequency double that of the first source.

ARTUR FLAD.